UNITED STATES PATENT OFFICE.

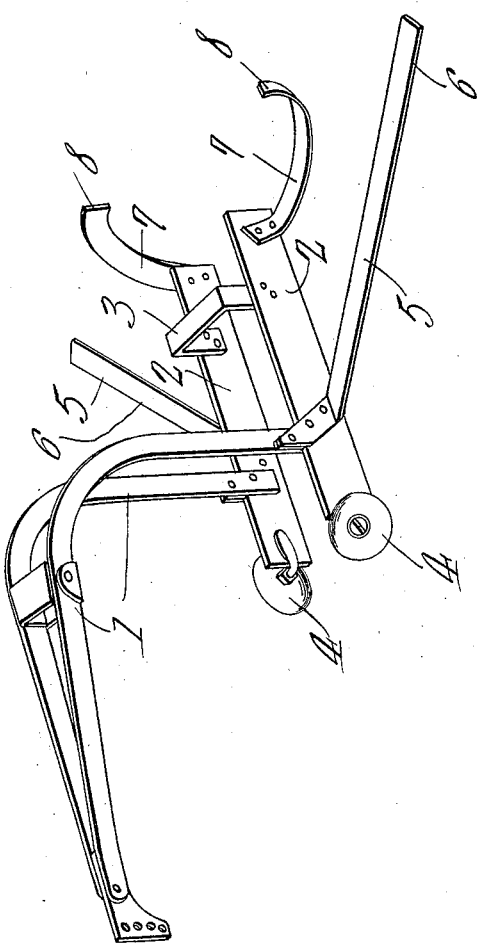

MIRT L. McATEE, OF MOUNTAIN VIEW, OKLAHOMA.

WEEDER.

1,092,377. Specification of Letters Patent. Patented Apr. 7, 1914.

Application filed October 12, 1910. Serial No. 586,766.

*To all whom it may concern:*

Be it known that I, MIRT L. MCATEE, a citizen of the United States, residing at Mountain View, in the county of Kiowa and State of Oklahoma, have invented a new and useful Weeder, of which the following is a specification.

This invention has relation to weeders and consists in the novel construction and arrangement of its parts hereinafter shown, described and claimed.

One of the objects of the invention is to provide a weeder having parallel runners to which the weeding blades are connected, each runner being provided at its front end with a revoluble disk arranged to form a furrow for the runner.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawing which is a perspective view of the weeder, the preferred form of the invention has been shown.

The weeder consists of standards 1 which are spaced from each other at their lower rear ends and to the lower rear ends of which there is attached runners 2. The said runners 2 are in approximately parallel relation and spaced from each other. A yoke 3 connects the rear portions of the said runners together. Disks 4 are detachably applied to the forward ends of the runners 2 and when the weeder is used as a straddle row implement the runners pass at the opposite sides of the row of plants and the disks 4 also operate in the soil at the opposite sides of the row of plants and extend across the paths of travel of the runners and clear tracks for the same. Cutting blades 5 are detachably applied to the sides of the runners 2 approximately at the ends of the standards 1 and the said blades 5 have their major portion approximately horizontal and provided with cutting edges 6 which are disposed at angles of approximately 45° to the vertical plane of the runners 2. Curved listing blades 7 are also attached to the sides of the runners 2 in the vicinity of the rear ends thereof and the said blades 7 are provided with upward and inturned ends 8 which are adapted to cast the soil in a direction toward the ends of the blades 7 which are attached to the runners 2. The intermediate portions of the listing blades 7 are bowed downwardly and are located in planes lower than the horizontal plane in which the cutting edges 6 of the blades are located; the object of which is apparent when the weeder is used as a straddle row implement.

Presuming that the weeder is to be used as a straddle row implement, the disks 4 are applied to the forward ends of the runners 2 and the blades 5 and 7 are also attached to the sides of the said runner in a manner similar to that illustrated in the figure of the drawing. Then as the weeder is drawn along the row of plants with the runners 2 at opposite sides thereof the disks 4 will open shallow furrows at the opposite sides of the row of standing plants for the passage of the runners 2, and the cutting blades 5 will sever the weeds and other vegetable growths at the opposite sides of the row of plants. At the same time the listing blades 7 will cut into the soil and sever the roots of the weeds below the surface of the soil and the curved end portions 8 of the said blades will cast the soil back into the furrows which have been opened by the disks 4.

Having thus described the invention what I claim as new and desire to secure by Letters Patent is:—

A straddle-row weeder including rearwardly diverging standards, a runner fixedly connected to the rear terminal of each standard, the two runners being parallel, a yoke fixedly connecting the rear portions of the runners, a rotatable disk journaled at the front end of each runner, said disk arranged to form a furrow for the runner, and a weed cutting blade extending from each runner.

In testimony that I claim the foregoing as my own, I have hereto affixed my signature in the presence of two witnesses.

MIRT L. McATEE.

Witnesses:
O. W. COLLINS,
T. E. TUTTLE.

Copies of this patent may be obtained for five cents each, by addressing the "Commissioner of Patents, Washington, D. C."